United States Patent
O'Regan et al.

(10) Patent No.: US 6,292,340 B1
(45) Date of Patent: Sep. 18, 2001

(54) APPARATUS FOR ISOLATION OF HIGH IMPEDANCE FAULTS

(75) Inventors: Timothy M. O'Regan, Leland, IL (US); James Hannas, Thiensville, WI (US)

(73) Assignee: Electrical Materials Company, Genoa City, WI (US)

( * ) Notice: Subject to any disclaimer, the term of this patent is extended or adjusted under 35 U.S.C. 154(b) by 0 days.

(21) Appl. No.: 09/289,510

(22) Filed: Apr. 9, 1999

(51) Int. Cl.[7] ........................................ H02H 3/00
(52) U.S. Cl. ................... 361/78; 361/42; 361/62; 361/66; 361/115
(58) Field of Search ..................... 361/78, 62, 64, 361/66, 42, 115

(56) References Cited

U.S. PATENT DOCUMENTS

| | | | |
|---|---|---|---|
| 3,662,118 | 5/1972 | Phoenix | 179/90 |
| 4,313,146 | 1/1982 | Lee | 361/85 |
| 4,546,309 | 10/1985 | Kang et al. | 324/52 |
| 4,851,782 | 7/1989 | Jeerings et al. | 324/520 |
| 4,878,142 | 10/1989 | Bergman et al. | 361/80 |
| 5,012,510 | 4/1991 | Schaubs et al. | 379/92 |
| 5,025,470 | 6/1991 | Thornborough et al. | 379/107 |
| 5,495,384 * | 2/1996 | Wallis et al. | 361/64 |
| 5,550,751 | 8/1996 | Russell | 364/492 |
| 5,602,709 | 2/1997 | Al-Dabbagh | 361/85 |
| 5,734,575 | 3/1998 | Snow et al. | 364/482 |
| 5,784,441 | 7/1998 | Davis et al. | 379/106 |

* cited by examiner

Primary Examiner—Stephen W. Jackson
(74) Attorney, Agent, or Firm—Emrich & Dithmar

(57) ABSTRACT

This invention relates to an arrangement for sensing a change in pressure from a first state to a second state. This is function in a grid system which has a fault undetected by flow measurement devices. This arrangement consisting of remote monitors powered by a communication system with a stand alone power supply which will sense a significant change in pressure. The monitors, with time delay built in, transmit this change in status to a central host computer for grid system analysis. In normal means for stabilizing the grid system, a remote signal is sent from the host computer to an isolation device for isolating the fault from the remainder of the network system. Subsequently, the host computer notifies the operating department with written notice of the isolation action. In a specific application in electric power distribution network, a high impedance fault such as due to a downed line which is not sensed by a primary overcurrent protection device is detected, isolated and cleared without interrupting service to network customers not on the branch where the fault occurred.

26 Claims, 10 Drawing Sheets

APPARATUS FOR ISOLATION OF HIGH IMPEDANCE FAULTS

FIELD OF THE INVENTION

This invention relates generally apparatus for sensing and de-energizing a downed alternating current electric utility primary distribution circuit conductor which has developed into a high impedance fault and overcurrent protection devices or high impedance detection systems have been unable to detect or clear the fault.

BACKGROUND OF THE INVENTION

High impedance, low current faults, such as a downed distribution line conductor which is contacting a poor conductive earth composite, have proven to be difficult to isolate with present technology. Conventional overcurrent protection devices, both at the source and at strategic circuit locations, use the combined measurement of fault current magnitude and time duration to clear faults associated with downed grounded conductors.

Potential serious problems caused by a high impedance fault in an electrical distribution system include:

(1) a live bare wire or one with damaged insulation which is in contact with earth and is remotely located from the source;

(2) a live bare or insulated conductor downed and broken and in contact with a poor conducting medium, i.e., sand, rock, concrete, snow, blacktop or a tree;

(3) a live conductor broken and hanging above earth, with the load side of the conductor backfiring through a three phase power transformer; or (4) a live conductor down, but intact, and grounded through a poor conducting medium such as listed in item 2 above.

For reliability purposes, it is common practice to install downstream circuit reclosers, expulsion fuses or sectionalizers at all taps to the main stem distribution circuit. The intent of the application of these protection devices is to locally isolate downed faulted conductors in the smallest sections possible, yet maintain normal service to the balance of the customers on that same circuit. These downstream over-current protection devices are designed to be time coordinated with each other and the main circuit breaker in order to automatically isolate the downed primary conductor. Overcurrent protection devices are unable to distinguish low fault currents (high impedance faults) from normal load currents because trip settings for these devices are typically set at 125 to 250 per cent of maximum estimated peak load current. These levels are selected to minimize inadvertent tripping.

A hazardous condition for the public is created when energized high voltage conductors fall to the ground or come in contact with a high impedance return path and the overcurrent protection system fails to de-energize the conductor. Physical contact with an energized distribution primary conductor by any conducting body may cause serious injury or death due to electric shock. Numerous fatalities and serious injuries occur annually in the United States due to inadvertent contact with live downed power distribution conductors. Experience has shown that these conditions occur more frequently at distribution level voltages below 15KV, which is the predominant primary distribution voltage range in the United States.

Over the years, several high impedance fault detection systems have been developed. These techniques vary in their approach, but most monitor various arcing fault-generated harmonics rather than the fundamental frequency. There are a wide range of factors influencing the type and magnitude of the harmonics which may occur in this type of fault condition. In fact, certain wire down conditions may result in no arcing due to the insulating characteristics of ground material that the conductor has contacted, thus no harmonic is generated.

The technique of sensing high frequency components from arcing faults has been hindered by the fact that distribution feeder capacitor banks block the high frequency signal from the monitoring location. In addition, the source of the harmonic is not easily located on a grid system, as these signals are transmitted via the path of least impedance. In addition, an arcing high impedance fault may last intermittently for several seconds or even minutes if the involved conductor remains energized. The high impedance, low fault current condition also generally doesn't affect the stability of the power system. However, this type of fault creates a potentially large liability for the electric utility due to possible fire or electrocution.

A common prior art approach for detecting high impedance fault currents monitors a number of harmonic frequency components of the combined load and fault current on the electrical distribution circuit. The harmonic data is gathered and compared with a pattern which is characteristic of a normal system. This waveform data is analyzed in backup relay circuitry to operate the main feeder circuit breaker if an overcurrent sensing device has cleared the downed conductor.

An example of a prior art high impedance fault sensing arrangement is shown in the simplified schematic diagram of FIG. 1. An overhead distribution primary circuit 10 experiences a high impedance fault 12 on a branch tap 16 not detectable by a circuit reclosure 14 or a main overcurrent relay-circuit breaker combination 18. A high impedance detection arrangement 20 receives generated signals through a transducer 22. The signal is conditioned and compared by a microprocessor 24 with a stored signal pattern which is characteristic of normal system operation. A microcomputer 26 makes a trip-output decision based upon several operating parameters which are weighted.

A high impedance fault isolation system is needed for electrical utilities to minimize the time period that a downed wire remains alive, after an overcurrent protection device has failed to de-energize the downed live wire. It can also provide a higher quality of service to other customers on the same distribution circuit by isolating a high impedance fault and permitting normal service to continue on the remainder of the circuit.

The present invention overcomes the aforementioned limitations of the prior art by sensing loss of voltage on the load side of a downed conductor rather than an overcurrent situation in detecting a high impedance fault condition. The detection and isolation of the downed live conductor is automatically analyzed and controlled by a host computer through remote tripping of an isolation device. This process occurs automatically and serves as a backup to an overcurrent protection system for de-energizing high impedance electrical distribution system primary faults.

OBJECTS OF THE INVENTION

Accordingly, it is an object of the present invention to detect and de-energize a downed conductor which presents a high impedance fault in an electrical distribution system. The present invention is intended for use as a backup to an overcurrent protection arrangement in the electrical distribution system which has not cleared the high impedance fault.

It is another object of the present invention to, in the event of a high impedance fault in an electrical distribution system, automatically isolate the fault from the remainder of the system without interrupting service to the unaffected distribution system users.

It is still another object of the present invention to determine the specific source of a high impedance fault in an electrical distribution system such as a down wire or an isolated equipment failure, e.g., a transformer fuse.

A further object of the present invention to determine that a tap or group protection device has properly operated and no tripping action is required by a host analyzing computer in an electrical distribution system.

A still further object of the present invention is to determine the specific location in an electrical distribution of a dangerous condition such as a high impedance fault.

Another object of the present invention is to provide an indication on an electrical distribution system status monitoring arrangement of the clearing of a high impedance fault in the system and a return to safe operation.

BRIEF DESCRIPTION OF DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
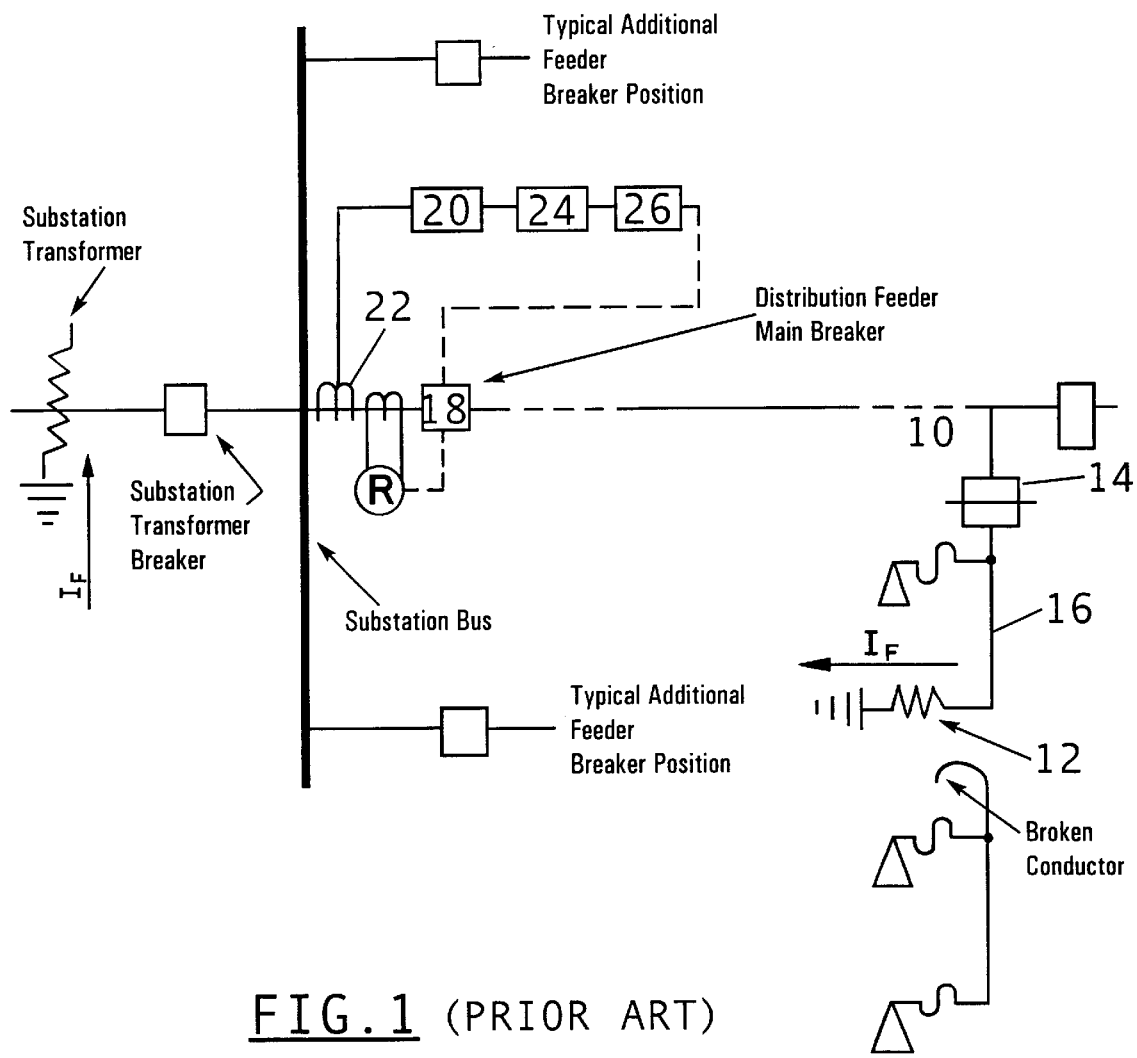
FIG. 1 is a simplified combined block and schematic diagram of a prior art high impedance fault sensing arrangement.
Figure 2:
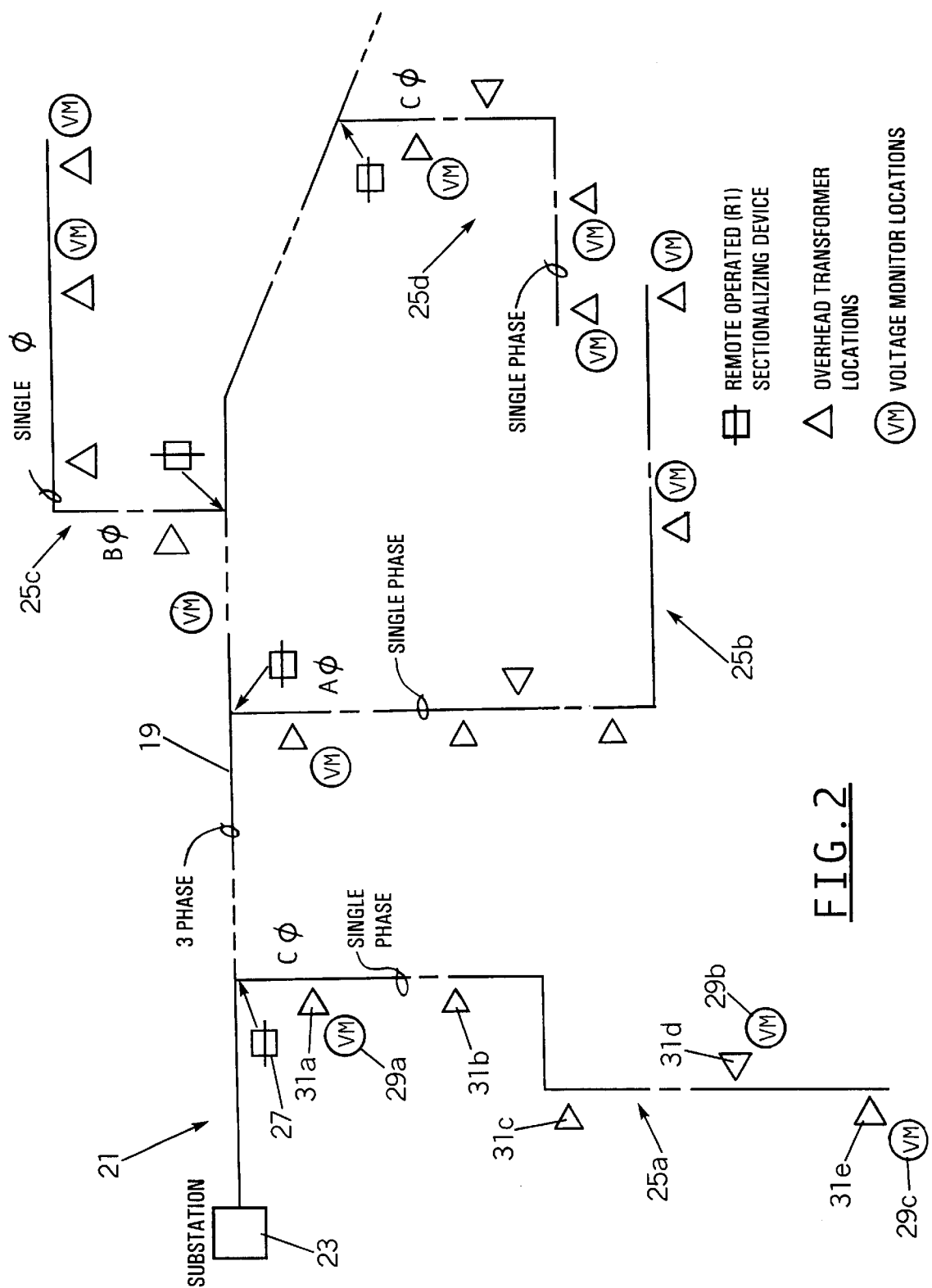
FIG. 2 is a simplified schematic diagram of a portion of an electrical distribution system incorporating an arrangement for isolating high impedance faults in the system in accordance with the present invention.

Referring to FIG. 2, there is shown a simplified schematic diagram of a portion of an electrical distribution system 21 incorporating an arrangement for isolating high impedance faults in accordance with the present invention. The electrical power distribution system 21 includes a substation 23 and a three-phase main line 19. Coupled to the main line 19 are a plurality of branches 25a, 25b, 25c and 25d, each of which has a single phase. Each of the branches is essentially the same, with additional details of only the first branch 25a provided herein for simplicity. The first branch 25a includes a plurality of distribution transformers 31a, 31b, 31c, 31d and 31e, each of which is shown as a triangle in the figure. The first branch 25a further includes a plurality of voltage monitors 29a, 29b and 29c, each of which is shown in the figure in the form of a "VM" enclosed in a circle. Each voltage monitor is coupled to an independent communications system such as a telephone network and is further connected to the secondary side of a respective transformer. The first branch 25a further includes a remote operated sectionalizing device 27 located at the juncture of the branch and the main line 19 of the electrical distribution system 21.

Figure 3:
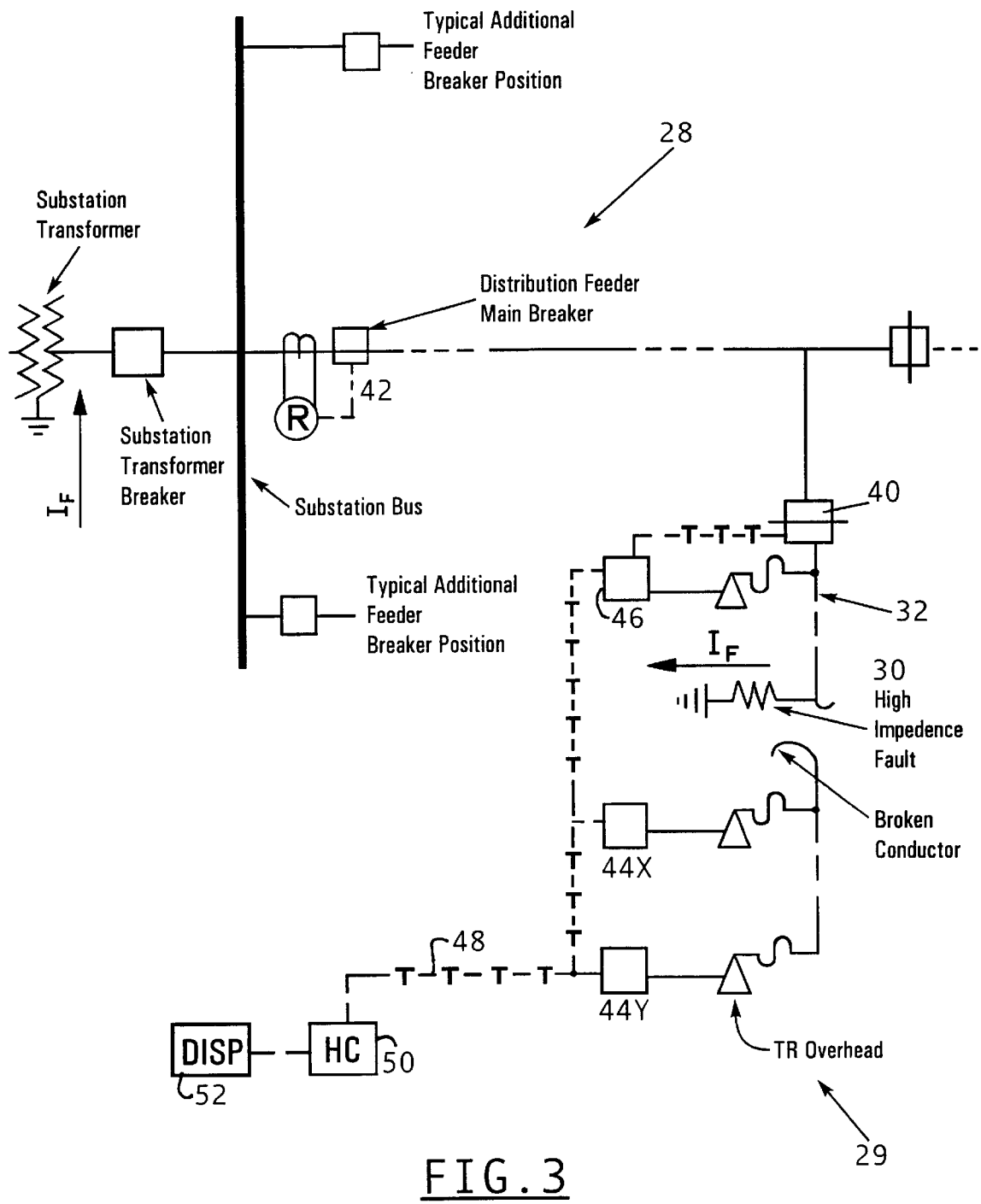
FIG. 3 is a simplified combined block and schematic diagram illustrating the location of the voltage monitoring modems, analyzing host computer, and remote tripping recloser control for an electrical distribution system in accordance with the present invention.

Referring to FIG. 3, there is shown a simplified schematic diagram of an overhead distribution primary circuit 28 incorporating a high impedance fault detection and isolation arrangement 29 in accordance with the present invention. The overhead distribution primary circuit 28 experiences a high impedance fault 30 on a branch tap 32 not detectable by a circuit reclosure 40 or by a main overcurrent-relay circuit breaker combination 42. Voltage Monitors (VM) 44X,44Y and a combination voltage monitor reclosure trip control (CVMRTC) 46 are programmed to check the AC system voltage magnitude each half second for a one cycle duration. A root mean square (RMS) voltage less than 85 Volts is considered a loss of voltage. Voltage monitors 44X, 44Y store a change in voltage status and if the status change continues beyond a preselected time delay, the voltage status is transmitted by an internal modem over a communication link 48 (either in the form of a telephone hard wire system, a radio frequency (RF) link, or a transmitter-receiver satellite) to a host computer (HC) 50. The host computer 50 after analyzing the condition status of each of voltage monitors 44X,44Y, and the combined voltage monitor recloser trip control (CVMRTC) 46 in the group, makes a decision in accordance with a program stored in the computer. If the data received indicates a wire down condition, the host computer 50 sends a coded trip signal to the combined voltage monitor recloser trip control 46 which trips circuit reclosure 40, isolating the high impedance fault. The host computer also forwards written location information to a work dispatcher (DISP) 52 in the high impedance fault detection and isolation arrangement 29 of the present invention.

Figure 4A:
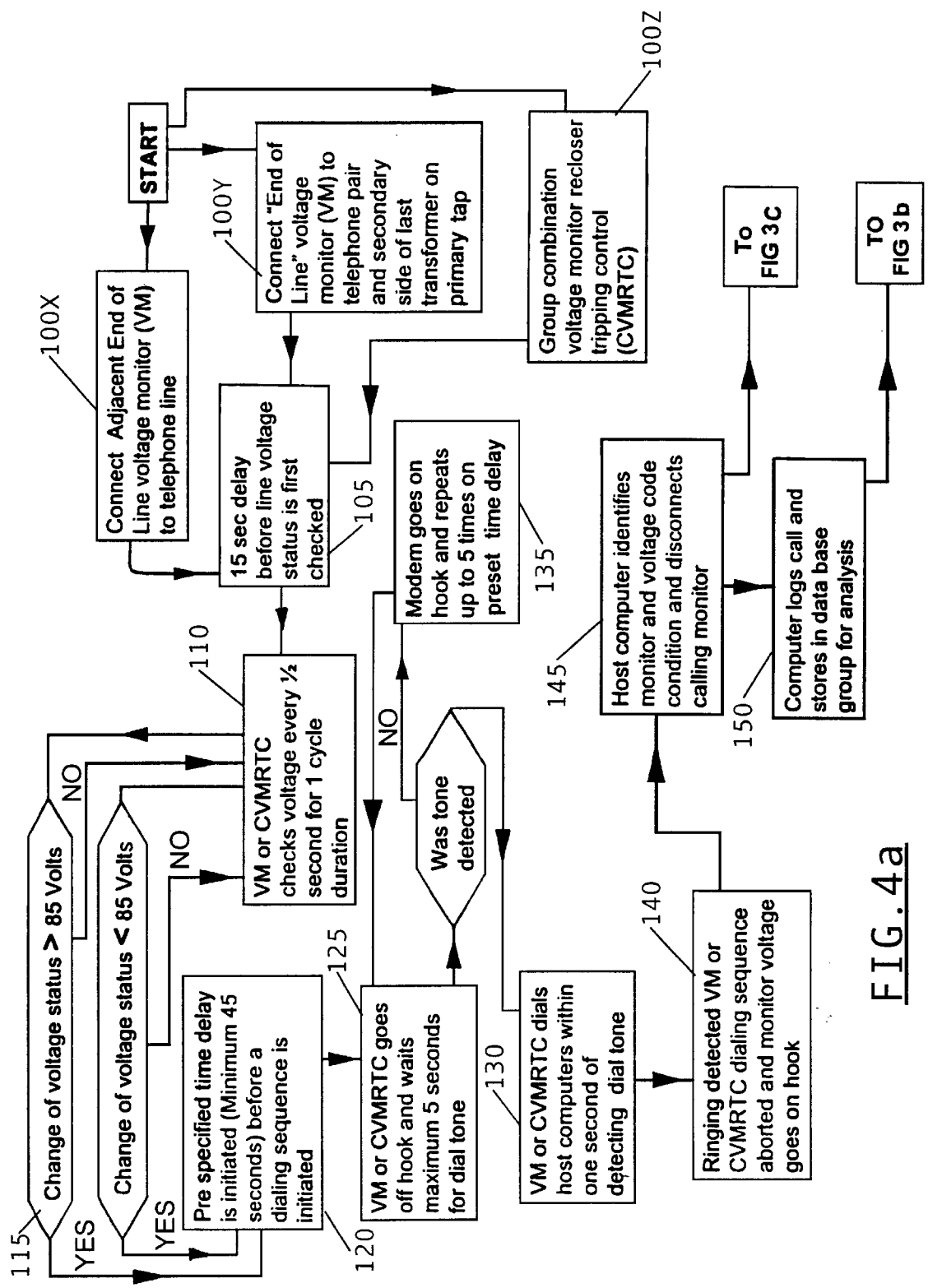
FIGS. 4a, 4b, and 4c are flow diagrams illustrating the various operations carried out by the high impedance isolator of the present invention.
Figure 4B:
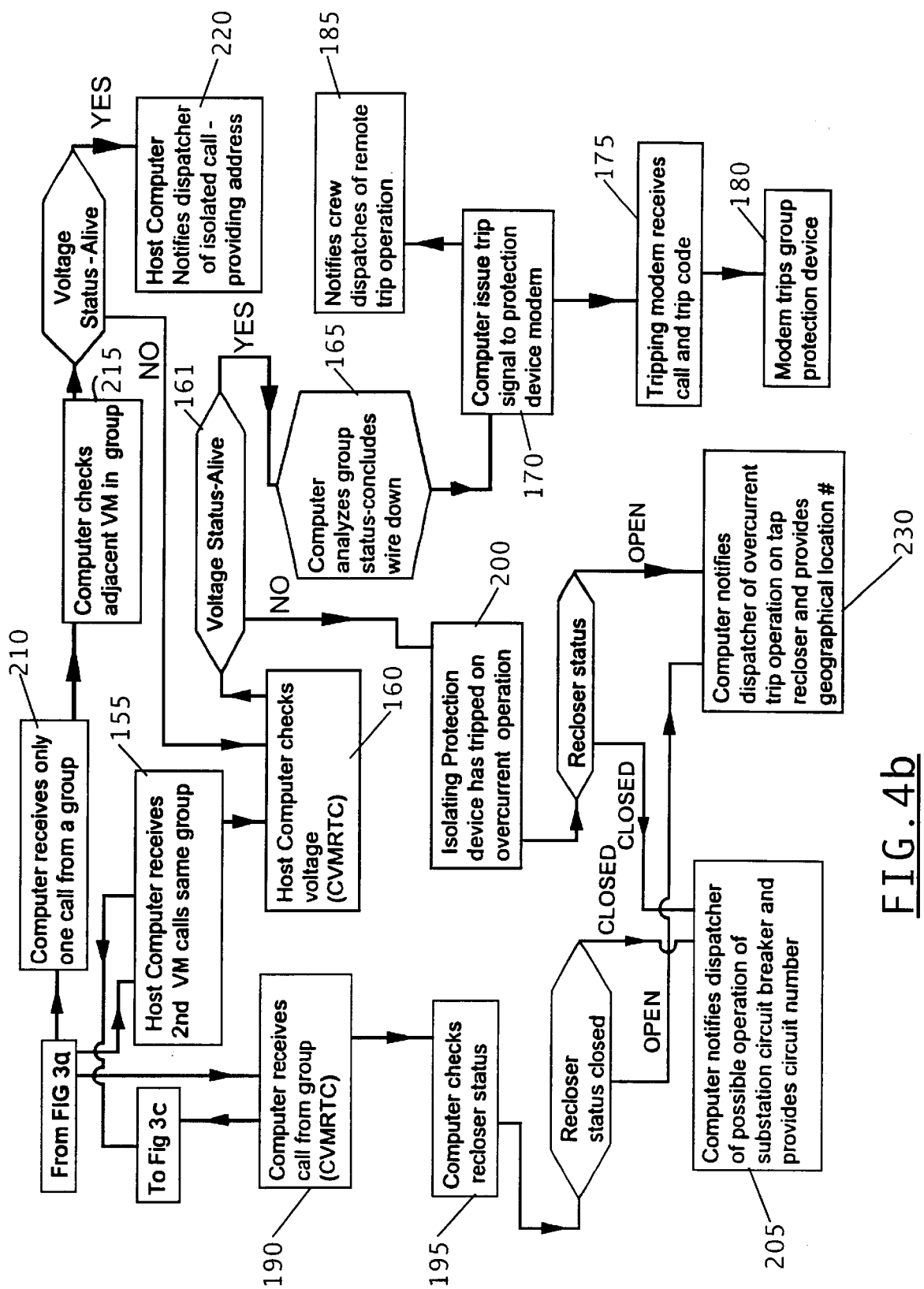
Figure 4C:
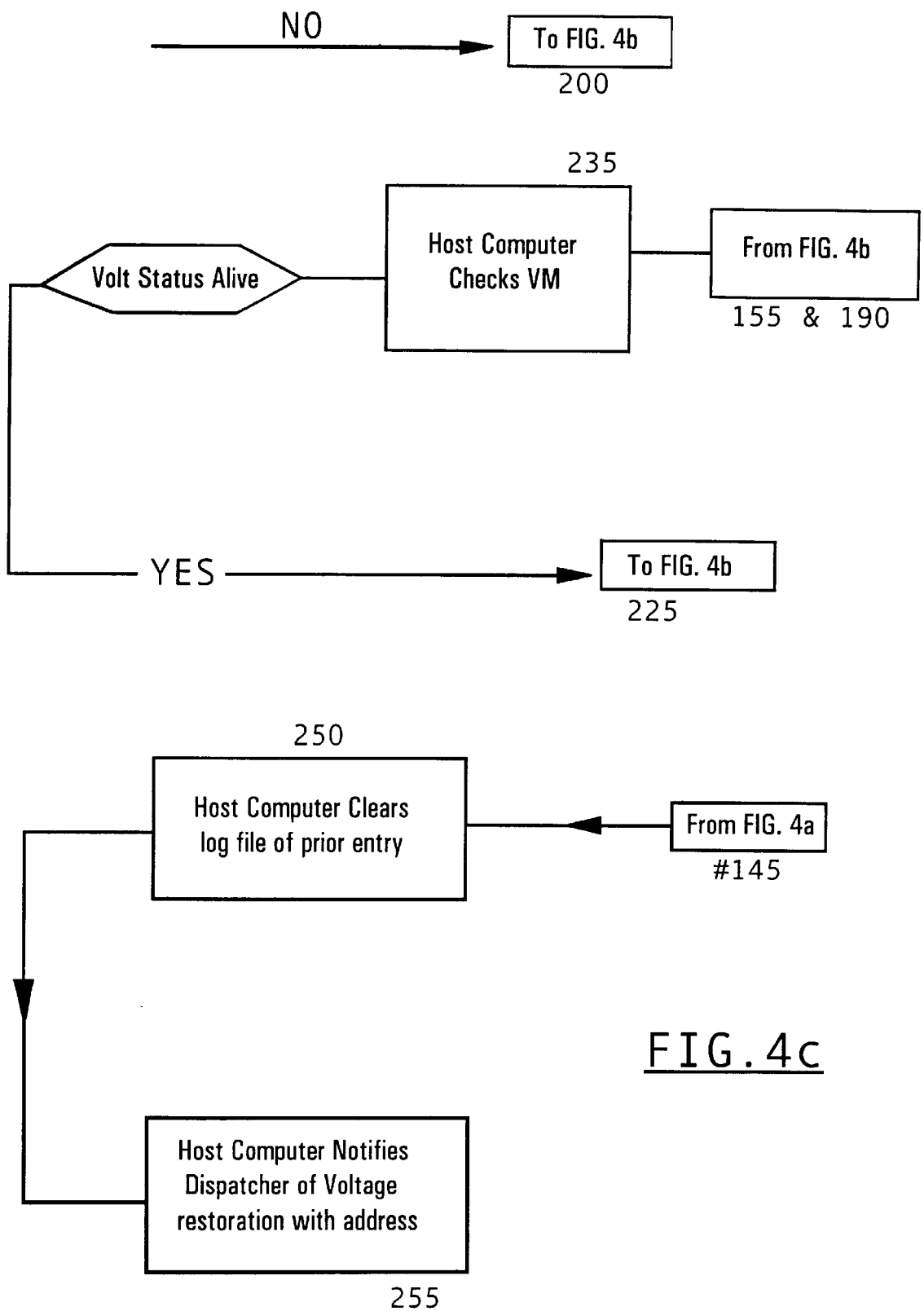

Referring now to FIGS. 4a, 4b and 4c, there are shown a series of flow charts illustrating the various operations carried out by the high impedance fault detection and isolation arrangement of the present invention. Upon initial installation of a group of voltage monitors at steps 100X, 100Y, and the CVMRTC at step 100Z, there is a 15 second time delay at step 105 before system voltage status is initially checked by each voltage monitor at step 110. The voltage monitors and CVMRTC which are controlled by microprocessor devices are programmed to check the AC voltage level every one half second for a one cycle duration at step 110. The AC voltage monitors are each connected to the 120/240 volt secondary side of a respective distribution transformer. Upon sensing a change in status of the AC voltage, the microprocessor introduces programmed time delay at step 120. If the AC voltage remains in this changed state for the programmed time delay, an internal modem which is connected to an independent communications network such as a telephone system will go off hook and wait a minimum of five seconds to receive a dial tone at step 125.

Within one second of receiving a dial tone, the voltage monitor at step 130 dials one of two stored digit telephone numbers-one for voltage loss, the other for voltage restored. If the voltage monitor detects a busy signal or no answer, it goes on hook at step 135 and following a preset time delay repeats a call attempt until connection is made with the host computer. Where touch-tone dialing is available, this system uses a 50—50 MS DTMF tone sequences. Where an older pulse dialing system is used, a larger capacity microprocessor is required to complete calls from the modems. If ringing is detected, the monitor dialing sequences are aborted and the unit goes on-hook at step 140.

The host computer, using visual basic software, is activated between the first and second ring at step 145. The specific reporting modem "I.D. number" and "voltage condition" are recorded by the host computer with the date and time of the call and this information is stored in a specific file for analysis at step 150.

After receiving the first call from a voltage monitor, the host computer is programmed with a time delay of 45 seconds to await additional calls from its specific monitor group. If an adjacent voltage monitor in the same group rings in as detected at step 155, indicating loss of voltage, the computer is programmed to make a status check of the CVMRTC at step 160.

If the CVMRTC indicates that it is energized at step 161, the host computer analyzes the data of a specific group at step 165, and then executes a decision on a possible wire down by sending a coded trip signal at step 170 via the telephone system to the recloser CVMRTC at step 175 to remotely trip the involved primary tap group protection device at step 180, isolating the downed live primary conductor. The outage information regarding the protective device location and operating status is then forwarded at step 185 by the host computer to a crew dispatcher for action.

If all voltage monitors including the CVMRTC 190 in a group indicate a loss of voltage, the host computer is programmed to check recloser status at step 195.

If the host computer receives a call from a CVMRTC voltage monitor, any of the following conditions may be possible.

(1) Main feeder breaker open;
(2) A recloser status check is conducted at step 195 by the host computer. If the recloser is open, the host computer notifies the dispatcher of overcurrent operation of a group protection device at step 200 and provides appropriate geographical addresses. If the recloser is closed, the host computer checks other associated group monitors and if they indicate a loss of voltage, the host computer notifies the dispatcher of possible main circuit breaker operation and provides the appropriate circuit number to the dispatcher at step 205;
(3) Feeder tap overprotection device is open;
(4) If the host computer logs in a first voltage monitor call at step 150, receives a second voltage monitor call at step 155 and checks the CVMRTC at step 160 and finds no voltage, and the isolating devices shows an open tap recloser via a status check at step 230, the host computer then notifies the dispatcher of overcurrent operation at step 200;
(5) Isolated Incident; if the host computer receives only a loss of voltage call from a CVMRTC at step 190, the host computer checks another group of voltage monitors at step 235 in FIG. 4c. If the other group of voltage monitors is alive, the host computer issues a notification of an isolated incident at step 225; or (6) Restoration of Voltage. The restoration of voltage after a previously reported outage involves a voltage monitor or CVMRTC status check at step 110 every half second. If there is a change in status and the voltage is restored at step 240, the host computer proceeds through the call sequence of steps 120, 125, 130, 140, 145, 250, and 255 and notifies the dispatcher of voltage restoration at the affected addresses.

Voltage Monitor Circuit Description

Figure 5:
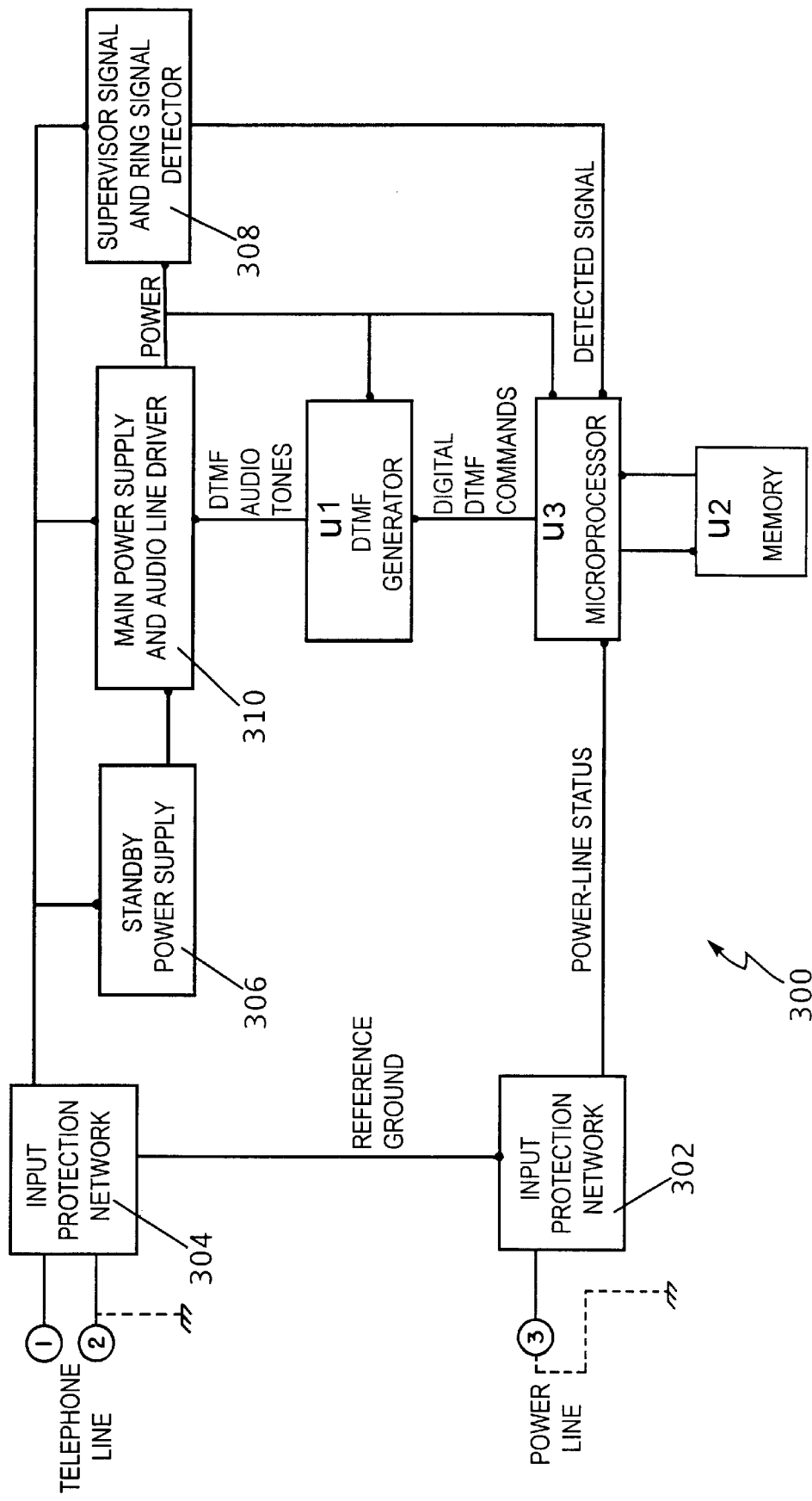
FIG. 5 is a block diagram of a voltage monitor used in the high impedance fault sensing arrangement of the present invention.
Figure 6:
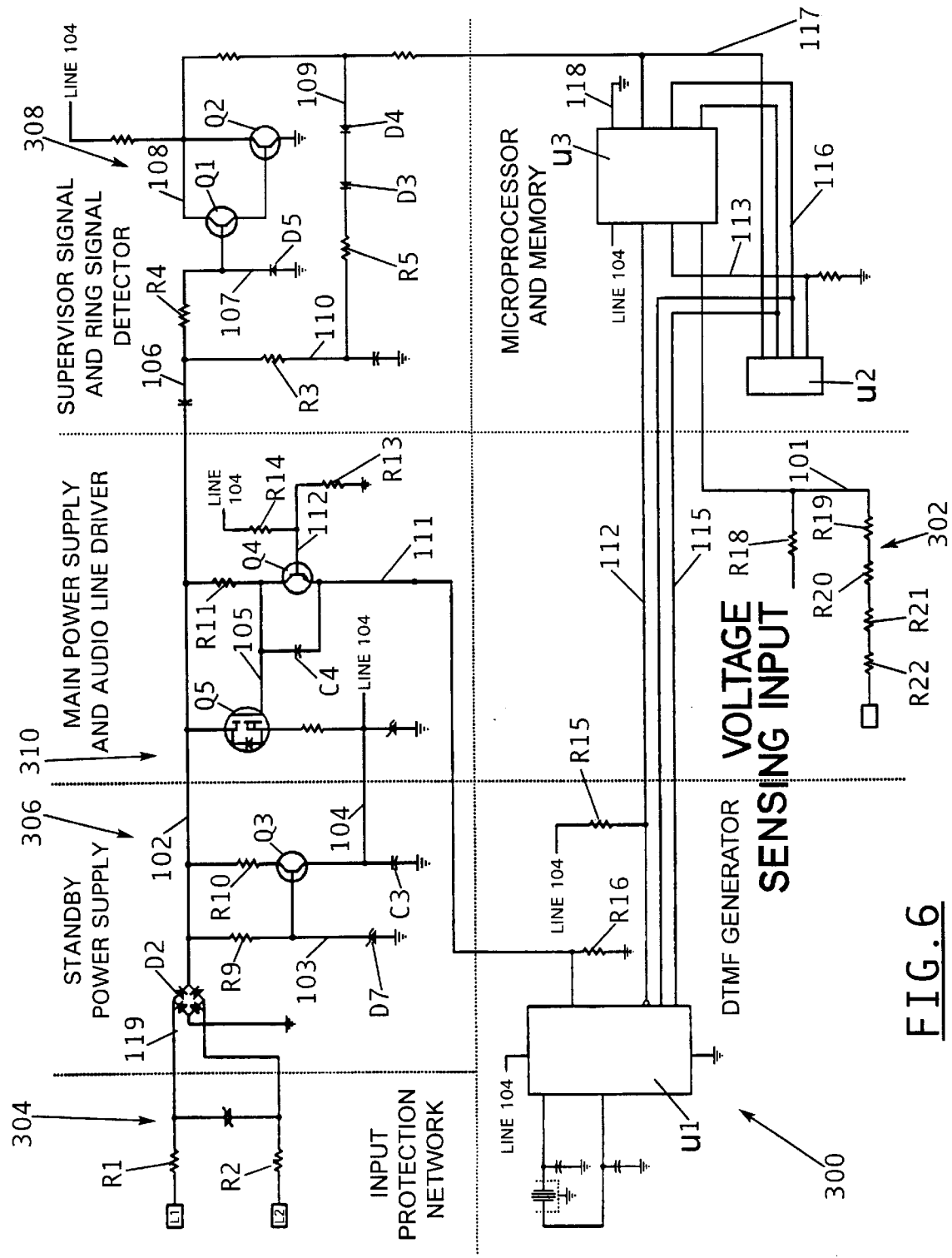
FIG. 6 is a schematic diagram of the voltage monitor shown in FIG. 5.

Referring to FIG. 5, there is shown a simplified block diagram of a voltage monitor 300 used in the high impedance fault isolation arrangement of the present invention. A more detailed schematic diagram of the voltage monitor 300 is shown in FIG. 6. Voltage monitor 300 represents a novel approach to monitoring the status of a voltage in an electric power distribution system.

A design goal for the voltage monitor power supply is to avoid the use of back-up batteries or super capacitors. Thus, the voltage monitor is powered by a standard voice grade telephone line. Its operating power is provided in two modes-a standby mode (minimal power) and a transmit/receive mode (full power).

Standby power is adequate when the monitor is in the voltage sensing mode. The standby operating power, drawn by the voltage monitor during AC voltage sensing, draws a DC load current that is below the telephone central office equipment pickup value. The main microprocessor U3 operates repetitively on an internal half second timer. Every half second, the utility line voltage is checked for a change in status. There are two possible states of voltage—(1) AC voltage greater than 85 Volts RMS or (2) AC voltage less than 85 Volts RMS (loss of voltage). The intermittent activity of the main microprocessor U3 reduces the standby power requirement of the voltage monitor to 0.028 watts in the standby mode.

Full power is also provided through the voice grade telephone line, via activation of the main microprocessor U3, an associated memory chip U2 and a touch-tone dialing chip U1. Full power is only required when the voltage monitor is in the communication mode. Since the voltage monitor's DC load current drawn is less than that used by a standard telephone set, this full power can also be provided by the central telephone system equipment. The telephone central office equipment detects a telephone "Off Hook" condition by the amount of DC current drawn when the receiver is effectively lifted off its Hook or contact is "made up" representing an intent to make a call.

The monitored AC line voltage is provided to the voltage divider at L3, consisting of a series of resistors R22, R21, R20, R19, and R18 connected to line 101. This resistance voltage divider functions as an input protection network 302 that permits the utility line and telephone line to be connected to the same circuit, without the usual isolation.

Providing power via the telephone lines causes no appreciable affects at the Telephone Central Office Equipment. The negative peak value of the utility monitored voltage is referenced to the negative 48 volt DC signal provided by the central telephone office equipment.

The result is that a negative 120 VAC sine wave into L3 results in a 0.5 Volt on microprocessor U3 pin 4. If the sensed utility line voltage is below a 85 Volt RMS threshold, referenced to 120 Volts RMS as standard, the voltage monitor indicates a loss-of-voltage.

The telephone line providing both power and communication applies a negative 48 volts DC to voltage monitor terminals L1 and L2, across which a high voltage filter is connected. This filter consists of two 3 OHM resistors (R1 and R2) and the full wave Bridge rectifier D2 connected to line 119. This filter plus a metal oxide varistor (2D1) connected to line 119 serve to reduce the magnitude of transient surges induced on the source telephone pair due to lightning strikes. The output of the full wave bridge D2 provides the voltage monitor 300 with a positive voltage via line 102, regardless of the polarity of voltage between terminals L1 and L2.

The integrated circuits U1, U2, U3, are powered by a standby voltage regulator power supply, when the telephone line is not being used for communication, referred to as "The Monitor on Hook condition." Only 0.028 watts of standby power is required for the voltage monitoring operation. This monitoring voltage regulator consists of resistors R9, R10, and a zener diode D7, Q3, which holds line 103 at a constant 5 volts. Capacitor C3, functions as the power supply filter, connected across the conductor 104 and a common conductor.

Signal Detector

The level of an audio signal on a telephone line can change with weather conditions. Thus, a signal detector circuit 308 is provided in the voltage monitor 300 to amplify the low level audio signals received from the telephone line. This amplifier provides an audio signal of sufficient strength for microprocessor U3 operation on a voice grade telephone line. Transistors Q1 and Q2, in the signal detector connected to line 108, form a very high gain amplifier, which amplifies the signal used by the microprocessor U3 to detect "dial tone," "busy" and "ring" signals generated by the telephone central office equipment.

Signal feedback through the circuit comprised of diodes D3, D4, and resistors R5, R3, and R4 connected to line 109 cause Q1 and Q2 to be DC biased such that the amount of signal on line 109 remains within 6 dB even were the audio signal varies by as much as 40 dB.

Diode D5 is connected across line 107 and common to protect the transistor Q1 from negative voltages.

The purpose of the voltage monitor 300 is to send coded information from a remote location to a host computer over standard voice-grade telephone line. Two forms of communication must take place in order to accomplish this task. The first exchange of information is between the voltage monitor and the Telephone Central Office. The monitor must signal the Central Office that it intends to make a telephone call. Then, the telephone number of the host computer must be sent. This can be accomplished in two ways, pulse dialing or touch-tone dialing. U1 is a touch-tone signaling integrated circuit which can generate the necessary tones for sending dual-tone-multiple-frequency DTMF codes. Microprocessor U3 uses touch-tone dialing chip U1 to perform the dialing operation and also to send coded information to the host computer.

All of the functions of the voltage monitor are controlled by microprocessor U3. Microprocessor U3 is preferably a PIC12C509 microprocessor from Microchip Technology Inc. of Chandler, Ariz. and is well known to those skilled in the art of designing microprocessor controlled systems. A detailed discussion of the operation of micro-processor U3 is omitted for the sake of simplicity.

The functions of the connections to microprocessor U3 are as follows:

Pin 1—U3 power supply unit connected to line 104.

Pin 2—Provides a 0 volt DC control signal to U1, DTMF chip, for information transfer. Resistor R15 connected to line 112 and to this pin so that the DTMF chip U1 will be deactivated when there is no control signal.

Pin 3—Provides a +5C Volt DC signal to the memory chip U2, pin 1 via line 113 when the microprocessor U3 wants to write or read information.

Pin 4—AC Line Voltage monitoring input connected to line 101.

Pin 5—U3 sends digital information to the DTM chip U1, pin 6 and memory chip U2, pin 3 connected to line 115.

Pin 6—Used to control information transfer between U1, U2, and line 116.

Pin 7—U3 uses this line to receive digital data from memory chip U2, pin 4 and for detection of a signal from the central telephone office connected to line 117.

Pin 8—Connected to common circuit line 118.

Memory Chip

Microprocessor U2 memory chip is used to store operating telephone numbers and the serial number of each voltage monitor. U2 is a 2,048 Bit EEPROM, electrically erasable programmable read—only memory chip. Its pin connections are explained with U3.

DTMF Generator

The DTMF generator chip U1 produces a 1 volt AC, 3 volt DC signal out of pin 7 connected to line 111. This signal must be coupled to the telephone central office and the host computer. This signal interfacing is accomplished by a unique Amplifier and a Power Switch circuit. U1, pin 7 is connected to R16 via line 111. The R16 resistance provides the proper termination impedance for U1, pin 7. There are two circuit paths between U1, pin 7 and Q5. The AC path for DTMF signals which are generated by U1 are sent over the telephone line provided by capacitor C4 connected to line 105. The second signal path is for a DC control signal through Q4 connected to line 105.

When microprocessor U3 is not communicating over the telephone line, it controls U1 such that U1, pin 7, line 111 provides a 0 volt DC signal to the emitter of transistor Q4. R14 connected between line 104 and line 112 provides enough current into base of Q4 such that Q4 is forward biased. This causes the gate of Q5, connected to line 105, to be biased at approximately 0 volts, thereby causing Q5 to be in pinchoff. This action results in the shutdown of the main power supply 310.

When microprocessor U3 elects to send signals over the telephone, it controls U1 such that U1, pin 7 connected to line 111 provides a 3 volt DC signal to the emitter of transistor Q4. Since the emitter of transistor Q4 is at 3 volts and the base of Q4 is biased at 2.5 volts by R13 and R14 connected line 112, Q4 is reverse biased. Voltage from line 102 is passed through R11 and causes the gate of transistor Q5 to be biased at the same potential as the drain of Q5. This results in positive bias on transistor Q5, thereby activating the main power supply 310.

Microprocessor U3 can further control DTMF generator U1 such that the DTMF control signals can also appear on U1, pin 7. These signals pass through capacitor C4 connected to lines 105 and 111 and cause the gate of transistor Q5 to be modulated. This results in a modulated current on the telephone which will be translated into proper audio signals by the telephone central office.

DTMF generator U1 is preferably a Holtek HT9200A DTMF generator chip. The operation of this integrated chip is similar to most other DTMF generator chips which are known to those skilled in the art of designing telephone communications. Memory U2 is preferably a NM93C56N EEPROM memory chip available from Fairchild Semiconductor, USA and is well known to those skilled in the art of designing microprocessor controlled systems. A detailed discussion of these two integrated circuits is thus deemed not necessary.

Operating Description of Voltage Monitor

There are four basic modes in which the voltage monitor microprocessor software may operate. These modes are: Utility Line Voltage Sensing Mode; Telephone Dialing Mode; Host Communication Mode; and a Polling Mode.

Utility Line Voltage Sensing Mode

In the Line Voltage Sensing Mode, microprocessor U3 sends a signal to the other microprocessors U1, U2 and U4 causing these latter circuits to enter a temporary shutdown mode during which they draw very small amounts of power (0.028 watts). Microprocessor U3 repeatedly activates a special half second internal wake-up timer and enters a temporary shutdown mode. After a half second delay, the wake-up timer reactivates microprocessor U3 and the state of the transformed utility line voltage is determined by sensing the magnitude for one cycle. There can be two possible voltage states, an AC voltage greater than 85 volts or less than 85 volts. If there has been a change-of-status on the line voltage since the last half second run cycle, microprocessor U3 fetches information from memory U2 and saves this information in its internal memory. Memory U2 is only activated for the amount of time necessary to get the information required, after which it is put in temporary shutdown mode. One of the bits of retrieved information is the time duration which must elapse before a telephone call is made to the host computer (for a loss of voltage or restored voltage). Microprocessor U3 then enters the shutdown mode and waits for the next half second wake up cycle. If there has not been a change-of-state utility line voltage, microprocessor U3 checks the telephone-call-time value. If this value is greater then one-half second, microprocessor U3 subtracts one-half second from the call-time value. If the resultant value is less than one-half second, microprocessor U3 enters the Telephone Dialing Mode. Microprocessor U3 also monitors the signals which are present on the telephone line. If the host computer attempts to contact the voltage monitor, a "Ring" signal will be detected, at which time microprocessor U3 will enter the Host Communication Mode.

Telephone Dialing Mode

In the Telephone Dialing Mode, microprocessor U3 sends a signal to U1 (the touch-tone signaling chip) which causes U1, pin 7 to activate the main power supply 310. This chip signals the telephone central office that microprocessor U3 intends to make a phone call. The central office responds by placing a "Dial Tone" audio signal on the telephone line. This signal is amplified by Q5 and Q6 and sent to microprocessor U3. A special digital filtering routine is used by microprocessor U3 to identify the "Dial Tone", Microprocessor U3 uses the information which had been previously retrieved from memory U2 to send the telephone number of the host computer to the central office by controlling U1 with a sequence of commands. The unit uses a 50—50 MS DTMF tone sequence to dial one of two numbers representing a voltage loss or voltage restored. Once the central office receives the telephone number, it attempts to make a connection with the host computer. While the central office is waiting for the host computer connection, it sends one of two audio signals back to the voltage monitor, either a "busy" tone or a "ring" tone sequence. Microprocessor U3 uses the signals from Q5 and Q6 along with digital filtering routines to determine whether the connection to the Host Computer has been successfully achieved.

Host Communication Mode

In the Host Communication Mode, the voltage monitor microprocessor U3 waits for 12 seconds to allow the host computer to prepare to send information. The host computer can request a voltage status. After the command is received, microprocessor U3 then fetches the unit serial number from memory U2 and sends the serial number and voltage status sensed condition to the host computer. After sending the status information, microprocessor U3 resets the change-of-state indicator to prevent further calls from being made, deactivates the main power supply 310 and returns to the Utility Line Voltage Sensing Mode.

Polling Mode

The voltage monitor responds to a telephone call from the host computer, forcing a reporting activity. This allows periodic verification that a voltage monitor is operational on both the telephone and electrical system.

After sending this status information, microprocessor U3 resets a change-of-state indicator to prevent further calls from being made, deactivates the main power supply, and returns to the Utility Line Voltage Sensing Mode.

High Impedance Fault—Intact Primary Conductor

The combination of a timer and a counter in the voltage monitor microprocessor U3 on the load side of a fault initiates tripping after a predetermined number of intermittent arcing incidents have occurred over a predetermined time period of selected time selected by a user. Intermittent arcing on a high impedance fault causes a variable voltage reduction on the load side of the primary fault. The combination timer counter must be in a voltage monitor on the load side of the fault to sense a reduced voltage value, which is approximately equal to the voltage across the high impedance fault. Any voltage reduction of 30% or greater results in a "loss of voltage" counter operation. The user may select the number of counter operations which must occur over a predetermined time to trigger a host computer signal to clear the intermittent high impedance fault on an intact, but arcing primary conductor.

Combination Voltage Monitor Recloser Trip Control Circuit Description

Figure 7:
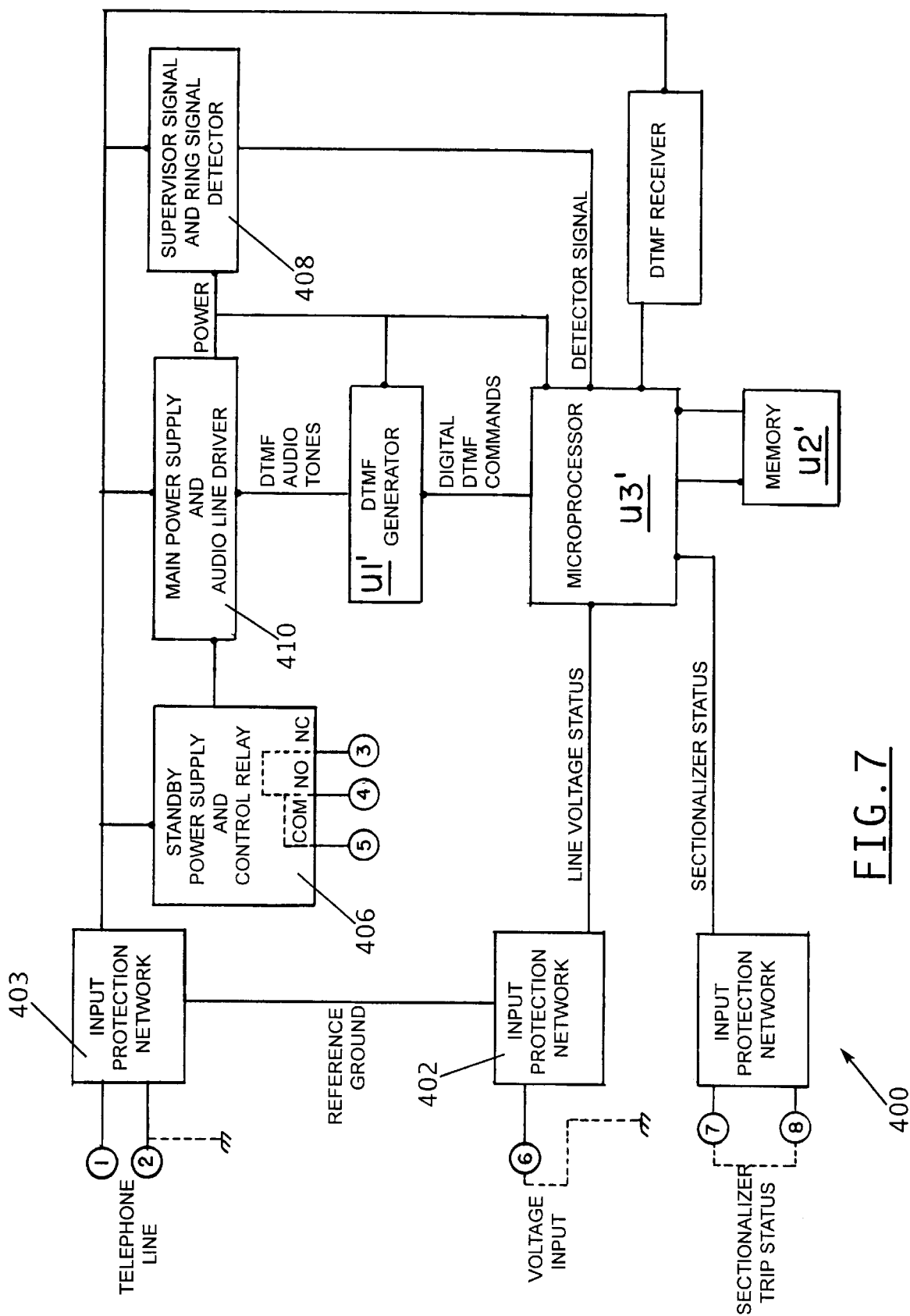
FIG. 7 is a block diagram of a combination voltage monitor and recloser trip control arrangement used in the present invention.
Figure 8:
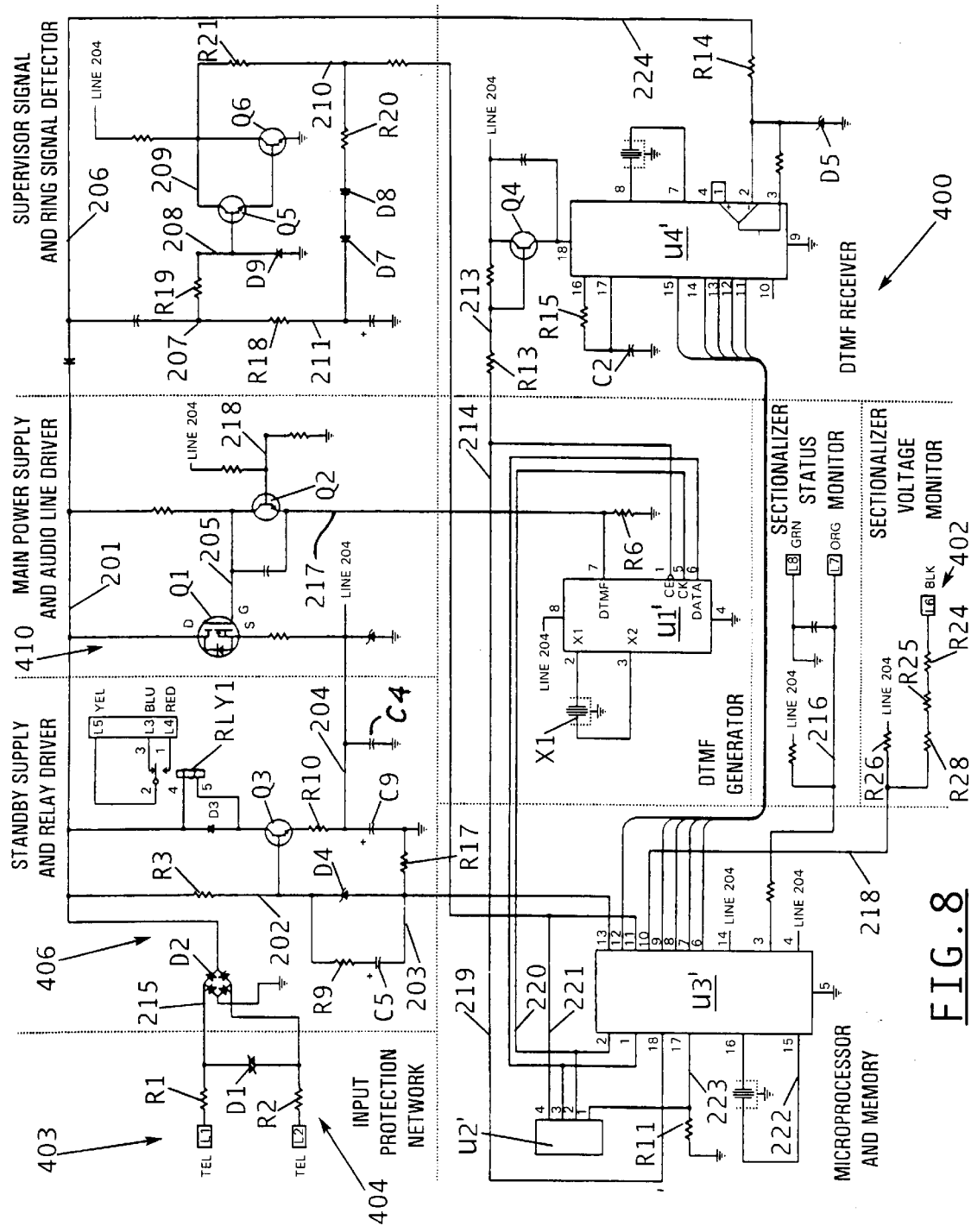
FIG. 8 is a schematic diagram of the combination voltage monitor and recloser trip control arrangement shown in FIG. 7.

Referring to FIG. 7, the combination voltage monitor recloser trip control (CVMRTC) 400 used in a preferred embodiment of the present invention is shown in block diagram form. Additional details of the CVMRTC 400 are shown in the schematic diagram of FIG. 8. The CVMRTC 400 represents a novel approach to monitoring the utility system voltage and subsequently, if required, isolating a primary high impedance fault from the remainder of the electric power distribution system.

A design goal for the combination voltage monitor trip control (CVMRTC) power supply is to avoid the use of back-up batteries or super capacitors. Thus this unit is powered by a standard voice grade telephone line. Its operating power is provided in two modes: a standby mode (minimal power) and transmitting/receiving mode (full power).

Standby power is adequate when the voltage monitor is in the voltage sensing mode. The main microprocessor U3' operates repetitively on an internal half second timer. Every half second, the utility line voltage is checked for a change in status. There are two possible states of voltage—there is an AC voltage greater than 85 Volts RMS or there is voltage less than 85 Volts RMS (loss of voltage). The intermittent activity of the main microprocessor U3' reduces the standby power requirements of the voltage monitor circuit to 0.028 watts in the standby mode.

Full power is also secured through the same voice grade telephone line, via activation of main microprocessor U3' and its associated U2' (memory chip), U1' (touch-tone dialing chip), and U4' (Decoder). Full power is required when the voltage monitor is in the communication mode. Since the DC telephone load current drawn is less than that used by a standard telephone set, this full power can also be provided by the central telephone system equipment. The telephone central office equipment detects a telephone "Off Hook" condition requesting service, by the amount of DC current drawn when the receiver is effectively lifted off its hook.

The monitored AC line voltage is inputted to a voltage divider 402, consisting of a series of resistors R24, R25, R26, and R28 connected to line 218. The resistance voltage divider 402 functions as an input protection network that permits the utility line and telephone line to be connected to the same circuit without the usual isolation.

Providing power via the telephone line will cause no appreciable affects at the telephone central office equipment. The negative peak value of the utility monitored voltage is referenced to the -48 volt DC signal provided by the central telephone office equipment. The result is a negative 120 VAC sine wave will provide a 0.5 Volt to the microprocessor U3', pin 4. If the sensed utility line voltage is below a 85 Volt RMS threshold, referenced to 120 Volts as standard, the voltage monitor indicates a loss-of-voltage.

A negative 48 DC voltage is applied to a CVMRTC input protection network 403 via terminals L1 and L2, across which a high voltage filter 404 is connected. This filter consists of two 3 OHM resistors (R1 and R2) and the full wave Bridge rectifier D2 connected to line 200. Filter 404 together with a metal oxide varistor (D1) serve to reduce the magnitude of transient surges induced on the source telephone pair due to lightning strikes. The output of the full wave bridge D2 on line 201 provides the monitor with a positive DC voltage, regardless of the polarity of the voltage between terminals L1 and L2.

The integrated circuits U1', U2', U3', and U4' are powered by a standby voltage regulator power supply. The condition "Monitor on Hook" is referenced when the voltage monitor and telephone line are not being used for communication. Only 0.028 watts of standby power is required for the voltage monitoring operation. This voltage regulator standby power supply 406 consists of resistors R9, R10, R17, capacitor C5 a connected line 203, zener diode D4 and a transistor Q3 connected to line 202. When the controller is in standby, the voltage on line 203 is held at 0 volts by the microprocessor U3', through pin 13. This biases line 202 connected to R3 and the base of transistor Q3 at a constant 5 Volts. The capacitors C4 and C9 are the power supply filter, connected across the line 204 and circuit common conductor.

Signal Detector

The level of an audio signal on a telephone line can change with weather conditions. Thus, a signal detector circuit 408 is provided in the CVMRTC to amplify the low level audio signals received from the telephone line. This amplifier provides an audio signal of sufficient strength for microprocessor U3' operation on a voice grade telephone line. Transistors Q5 and Q6 connected to line 209 in the signal detector 408 form a very high gain amplifier, which amplifies the signal used by the microprocessor U3' to detect "dial tone," "busy" and "ring" signals generated by the telephone central office equipment.

Signal feedback through the circuit comprised of R21, R20, D7, D8, R18 and R19 cause transistors Q5 and Q6, connected to line 209, to be DC biased, such that the amount of signal on line 209 remains within 6 dB, even when the audio signal varies by as much as 40 dB. Diode D9 is connected across line 208 and common to protect the base of transistor Q5 from negative voltages.

Touch-tone Signal Integrated Circuit

The purpose of the CVMRTC is to send information from a remote location to a host computer over standard voice-grade telephone lines. Two forms of communication must take place in order to accomplish this task. The first exchange of information is between the CVMRTC and the telephone central office. The monitor must signal the central office that it intends to make a telephone call. Then, the telephone number of the host computer must be sent. This can be accomplished in two ways, pulse dialing or touch-tone dialing. U1' is a touch-tone signaling integrated circuit which can generate the necessary tones for sending dual tone-multiple frequency codes (DTMF). Microprocessor U3' uses the touch-tone signaling circuit U1' to perform the dialing operation and also to send information to the host computer.

When outgoing communication is not needed, the main microprocessor U3' controls touch-tone dialing chip U1' such that U1', pin 7, provides a 0 volt DC signal to the emitter of transistor Q2. R14 provides enough current into base of transistor Q2 such that transistor Q2 is forward biased. This causes the gate of transistor Q1 connected to line 201 to be around 0 volts, thereby causing transistor Q2 to be in pinchoff. This action results in the shutdown of the main power supply 410.

When the microprocessor U3' elects to send signals over the telephone line, it controls U1' such that U1', pin 7, provides a 3 volt DC signal to the emitter of transistor Q2. Since the emitter of transistor Q2 is at 3 volts, and the base of transistor Q2 is biased at 2.5 volts by R13 connected to line 213, and R14 connected to line 224, transistor Q2 is reversed biased. Voltage from line 201 is passed through R11 and causes the gate of transistor Q1 to be biased at the same potential as the drain of transistor Q1. This results in positive bias transistor Q1, thereby activating the main power supply 410.

This 3 Volt DC signal must be coupled to the telephone central office and the host computer. This signal interfacing in accomplished by a unique amplifier and a power switch circuit consisting of transistors Q1 and Q2 and related components U1', pin 7, connected to R6 via line 217. This resistance provides the proper termination impedance for U1', pin 7. There are two circuit paths between U1', pin 7, and the ring signal detector transistor Q1. Capacitor C4 connected to line 204 and common, provides an AC path for the DTMF signals which when generated by U1', must be sent over the telephone line. A DC control signal is sent through a second signal path via transistor Q2 connected to line 217 and 205.

The microprocessor U3' can further control U1' such that the DTMF control signals can also appear on U1', pin 7. These signals pass through capacitor C4 and cause the gate of transistor Q1 to be modulated. This results in a modulated current on the telephone line which will be translated into proper audio signals by the telephone central office.

The connection and applications for the DTMF circuit U1' are as follows.

Pin 1 is connected to microprocessor U3', pin 18, for receiving information.

Pin 2 and pin 3 are connected to each end of crystal X1. An amplifier contained within U1' uses crystal X1 as a stable frequency resonant element to provide an accurate frequency reference for the internal generator circuitry.

Pin 4 is connected to circuit common.

Pin 5 is connected to microprocessor U3', pin 2, to transfer information Pin 6 is connected to microprocessor U3', pin 1, to receive digital information.

Pin 7 is connected to R6 via line 217 which provides the proper termination impedance.

Pin 8 is connected to the power supply via line 204.

DTMF circuit U1' is preferably a Holtek HT9200A DTMF generator chip. The operation of this IC is similar to most of the other DTMF generator chips which are known to those skilled in the art of designing telephone communications. A detailed discussion thereof is not deemed necessary.

Decoder

The CVMRTC must be able to receive and decode the DTMF code. The decoder U4' converts the audio DTMF signals into digital signals used by computer programs within microprocessor U3'.

Decoder U4' operates only when the CVMRTC is communicating with the host computer. The decoder's operating power requirements exceed that which is available from the standby power supply. Thus, when the decoder U4' is required, microprocessor U3' places 0 Volts on line 214 which provides a bias current into the base of transistor Q4 for saturation, thereby permitting power to flow via line 204 into decoder U4'.

An accurate frequency reference for the reference for the balance of the decoder circuitry is provided by crystal X2, connected across pins 7 and 8 of decoder U4'. An amplifier contained within decoder U4' uses crystal X2 as a stable frequency resonant element.

An RC time delay element (formed by R15 and C2) is connected to decoder U4', pin 16 and pin 17, and is used by the decoder to determine the time period which must elapse before a stable DTMF signal is decoded and outputted to microprocessor U3'.

A zener diode D5 is connected between line 212 and common to protect the input decoder U4'.

Decoder U4' is turned off by an electronic switch transistor Q4, operated by microprocessor U3'. The microprocessor U3' turns off the electronic switch transistor Q4 by applying 5 volts to line 214, which both shuts off the decoder U4' and activates the standby power supply for the voltage monitoring.

Microprocessor U3'

All the previously described integrated circuits are controlled by the Microprocessor U3', which controls all functions of the CVMRC. An explanation of the connections to microprocessor U3' follows.

Pin 1—connected to U1', pin 6, and to U2', pin 3, via line 219. Microprocessor U3' uses this line to send digital information to U1' and U2'.

Pin 2—connected to U1', pin 5 and U2', pin 2, via line 220. Microprocessor U3' uses this line to control the transfer of information between U1', U2', and U3'.

Pin 3—voltage monitoring input to microprocessor U3' connected to line 219.

Pin 4—power supply input reset connected to line 204.

Pin 5—Connected to circuit common.

Pins 6, 7, 8, and 9 are connected to the outputs of U4', Pins 11, 12, 13, and 14, respectively. These lines provide binary information from decoder U4' which represent the DTMF analog signals which are sent from the host analyzing computer.

Pin 10—Provides recloser status input to the microprocessor connected to line 218.

Pin 11—The microprocessor uses this line connected to line 221 to receive digital data from U2', or to detect signals from the telephone central office equipment.

Pin 12—Is connected to the output of decoder U4', pin 15. Decoder U4' provides a +5 volt DC signal to microprocessor U3', pin 13. This signal passes through C5 and R9 connected to line 202 and into the base of transistor Q3. The resultant voltage across R9 connected to line 202 and into transistor Q3 causes transistor Q3 to become forward biased. This results in a sufficient flow of current through the coil RLY1 line 201 such that RLY1 connected to Line 201 operates, making an electrical connection between terminals L4 and L5. These terminals are connected to the recloser circuitry such that an electric connection between L4 and L5 will cause the recloser to "Trip," thereby isolating the high impedance fault.

Pin 14—Power supply input connected to line 204.

Pins 15 and 16 are connected to line 222 and to crystal X3. An amplifier contained within microprocessor U3' uses crystal X3 as a stable frequency resonant element to provide an accurate frequency reference for the internal microprocessor circuitry.

Pin 17—Connected to line 223 provides a +5 volt signal to U2' when the microprocessor wants to read or write information to U2'. R11 is connected between microprocessor U3', pin 17, and circuit common such U2' will be deactivated when the microprocessor is not providing a control signal.

Pin 18—Is connected to line 214 and U1', pin 5. U3' provides a 0 Volt DC signal 214 when the microprocessor wants to send information to U1' or receive information from U4'.

Memory Chip

The operating parameters of microprocessor U3' are stored in the memory chip U2'. Memory clip U2' is a 2,048 bit EEPROM electrically erasable programmable read-only memory chip, which will retain programmed information for more than 10 years without power. Pins 1,2,3 and 4 are connected to microprocessor U3', as described above. Pin 5 is connected to circuit common. Pin 8 is the power supply input.

Memory clip U2' is preferably a NM93C56N EEPROM memory chip available from Fairchild Semiconductor, USA and is well known to those skilled in the art of designing telephone communications. A detailed discussion there of is not deemed necessary.

The microprocessor U3' can further control U1' such that the DTMF controls signals can also appear on U1', pin 7. These signals pass through capacitor C4 and causes the gate of transistor Q1 to be modulated. This results in a modulated current on the telephone which will be translated into proper audio signals by the telephone central office.

U1' is preferably a Holtek HT9200A DTMF generator chip. The operation of this circuit is similar to most of the other DTMF generator chips which are known to those skilled in the art of designing telephone communications. A detailed discussion thereof is not deemed necessary.

Signal Detector

A signal detector circuit is provided which amplifies the low level audio signals on the telephone line. This provides an audio signal of sufficient strength for microprocessor U3' operation. The level of an audio signal on a telephone line can change with weather conditions. Transistors Q5 and Q6 form a very high gain amplifier which amplifies the signal used by the microprocessor U3' to detect "dial tone," "busy" and "ring signals" generated at the telephone central office.

Signal feedback through the circuit comprised of R21, R20, D8, D7, R18, and R19 causes transistors Q5 and Q6 to be DC biased, such that the amount of signal of line 210 remains within 6 dB event were the audio signals varies by as much as 40 dB. Diode D9 is connected across line 208 and common to protect transistor Q5 from negative voltages.

CVMRC must be able to receive and decode the DTMF code. The decoder U4' converts the audio DTMF signals into digital signals used by computer programs within microprocessor U3'. Decoder U4' operates only when the CVMRC is communicating with the host computer. The decoder's operating power requirements exceed that available from the standby power supply. Thus, when the decoder is required, U3' places 0 Volts on line 214 which provides a bias current into the base of transistor Q4 for saturation, thereby permitting power to flow via line 204 into the Decoder U4'. An accurate frequency reference for the balance of the decoder circuitry is provided by crystal X2 which is connected across pins 7 and 8 of decoder U4'. An amplifier contained within U4' uses crystal X2 as a stable frequency resonant element. An RC time delay element (formed by R15 and C2) is used by the decoder U4' to determine the time period which must elapse before a stable DTMF signal is decoded and outputted to the microprocessor U3'. A zener diode D5 is connected between line 212 and common to protect the input to decoder U4'. Decoder U4' is turned off by an electronic switch Q4 operated by microprocessor U3'. Microprocessor U3' turns off the electronic switch Q4 by applying 5 volts to line 214, which both shuts off power to the decoder U4' and activates the standby power supply for voltage monitoring.

Recloser Controller Communication

During communication between the recloser controller and the host computer, two pieces of information about the recloser are required: (1) voltage status on the load side; and (2) operational status (opened or closed). The line voltage sensing input is connected to terminal L6. Terminal L6 is connected to a resistive voltage divider which is input to pin 4 on microprocessor U3'.

When microprocessor U3' elects to operate the recloser, a +5 volt DC signal is provided at U3', pin 13. The signal passes through the coil of recloser control relay such that RLY1 operates, making an electrical connection between L4 and L5 which will cause the recloser to "Trip," thereby de-energizing the high impedance fault connected to the recloser.

The second piece of information sent to the host computer is the operational status of the recloser. An auxiliary switch is mounted on the recloser. The switch is connected across terminals L7 and L8. When the recloser is closed, the auxiliary switch will provide an electrical connection between L7 and L8. When the recloser is open (load side de-energized), no electrical connection exists between L7 and L8. A 5 volt DC potential will be applied via R27 to pin 3 on the microprocessor U3' via R29.

The purpose of the CVMRC is to send information from a remote location to a host computer over standard voice-grade telephone lines. Two forms of communication must take place in order to accomplish this task. The first exchange of information is between the CVMRC and the telephone central office. The monitor must signal the central office that it intends to make a telephone call. Then, the telephone number of the host computer must be sent. This can be accomplished in two ways, pulse dialing or touch-tone dialing. U1' is a touch-tone signaling integrated circuit which can generate the necessary tones to be able to send dual tone-multiple frequency codes (DTMF). Microprocessor U3' uses U1' to perform the dialing operation and also to send information to the host computer.

The connection and applications for the U1', DTMF chip are as follows. Pin 1 is connected to microprocessor U3', pin 18, for receiving information. Pins 2 and pins 3 are each connected to crystal X1. An amplifier contained within U1' uses crystal X1 as a stable frequency resonant element to provide an accurate frequency reference for the internal generator circuitry.

Pin 4 is connected to circuit common.

Pin 5 is connected to microprocessor U3', pin 2, to transfer information.

Pin 6 is connected to microprocessor U3', pin 1, for receiving digital information.

Pin 7 is connected to R6 via line 217 which provides the proper termination impedance.

The DTMF chip U1' produces 1 volt AC, 3 volt DC signal out of pin 7. This signal must be coupled to the telephone central office and the host computer. This signal interfacing is accomplished by a unique amplifier and a power switch circuit. U1', pin 7, is connected to R6 via line 217. This resistance provides the proper termination impedance for U1', pin 7. There are two circuit paths between U1', pin 7, and transistor Q5. Capacitor C4 provides an AC path for the DTMF signals which are generated by U1' and must be sent over the telephone line. The second signal path is a DC control signal through transistor Q4.

When the microprocessor U3' elects to send signals over the telephone line, it controls microprocessor U1' such that U1', pin 7, provides a 3 volt dc signal to the emitter of transistor Q2. Since the emitter of transistor Q2 is at 3 volts and the base of transistor Q2 is biased at 2.5 volts by R13 and R14, transistor Q2 is reverse biased. Voltage from line 201 is passed through R11 and causes the gate of transistor Q1 biased at the same potential as the drain of transistor Q1. This results in positive bias on transistor Q1, thereby activating the main power supply.

The microprocessor U3' can further control U1' such that DTMF controls signals can also appear on U1', pin 7. These signals pass through C4 and cause the gate of transistor Q1 to be modulated. This results in a modulated current on the telephone which will be translated into proper audio signals by the telephone central office.

U1' is preferably a Holtek HT9200A DTMF generator chip. The operation of this IC is similar to most of the other DTMF generator chips which are known to those skilled in the art of designing telephone communications. A detailed discussion thereof is not deemed necessary.

The microprocessor U3' controls all the functions of the CVMRC. U3' is preferably PIC12C509 microprocessor from Microchip Technology Inc. (Chandler, Ariz.) and is well known to those skilled in the art of designing microprocessor controlled systems. A detailed discussion thereof is not deemed necessary.

The CVMRC must be able to be able to receive and decode the DTMF code which are sent from the host computer. The decoder U4' converts the audio DTMF signals into digital signals used by the computer program in microprocessor U3'.

The decoder microprocessor U4' operates only when the recloser controller segment is communicating with the host computer. The decoder's operating power requirements exceed that available from the standby power supply. Thus, when decoder is required, microprocessor U3' places 0 volts on line 214 which provide a bias current into the base of transistor Q4 for saturation, thereby permitting power to flow from line 204 into decoder U4' from the telephone line.

Operating Descriptions for Combination Voltage Monitor and Recloser Control

There are four basic modes in which the microprocessor software may operate. These modes are Utility Une Voltage Sensing Mode, Telephone Calling Mode, Host Communication Mode and Polling Mode.

Utility Line Voltage Sensing Mode

In the Line Voltage Sensing Mode, microprocessor U3' sends a signal to the other microprocessors U1', U2' and U4' causing the chips to enter a shutdown mode during which they draw very small amounts of power (0.028 watts). Microprocessor U3' repeatedly activates a special half second internal wake-up timer and then enters a temporary shutdown mode. After a half second delay, the wake-up timer reactivates the microprocessor and the status of the utility line voltage is determined by sensing the RMS voltage magnitude for a one cycle duration. There can be two possible voltage states, an AC voltage greater than 85 volts or less than 85 volts (loss of voltage). If there has been a change-of-status on the line voltage since the last half second sensing cycle, microprocessor U3' fetches information from memory chip U2', and saves this information in its internal memory. U2' is only activated for the amount of time necessary to get the memory information required, after which it is put in temporary shutdown mode. One of the bits of retrieved information from U2' is the time duration which must elapse before a telephone call is made to the host computer (for a loss of voltage or restored voltage). Microprocessor U3' then enters the shutdown mode and waits for the next half second wakeup cycle. If there has not been a change-of-state of the voltage, microprocessor U3' checks the telephone-call-time value. If this value is greater then half second, microprocessor U3 subtracts half second from the call-time value. If the resultant value is less than half second, microprocessor U3' enters the Telephone Calling Mode.

Microprocessor U3' also monitors the signals which are present on the telephone line. If the host computer is trying to contact the recloser control, a "Ring" signal will be detected, at which time microprocessor U3' will enter into the Host Communication Mode.

Telephone Calling Mode

In the Telephone Calling Mode, microprocessor U3' sends a signal to U1' (the touch-tone signaling chip) which causes U1', pin 7, to activate the main power supply. This operation signals the telephone central office that the microprocessor intends to make a phone call. The central office responds by placing a "Dial Tone" audio signal on to the telephone line. This signal is amplified by transistors Q5 and Q6 and sent to microprocessor U3'. A special digital filtering routine is used by microprocessor U3' to identify the "Dial Tone". Microprocessor U3' uses the information which had been previously retrieved from memory U2' to send the telephone number of the host computer to the central office by controlling U1' with a sequence of commands. Once the central office receives the telephone number, it will attempt to make a connection with the host computer. While the central office is waiting for the host computer connection, it sends one of two audio signals to the CVMR, either a "busy" tone or a "Ring" tone sequence. The host computer waits for at least two rings so the calling unit can determine if a "busy" or "ring" has occurred. The monitor is programmed for a 5 second delay between call attempts and after 4 attempts an additional time delay can be introduced to repeat the sequence. Microprocessor U3' uses the signals from transistors Q5 and Q6 along with digital filtering routines to determine whether the connection to the host computer has been successfully achieved.

Host Communication Mode

In the host recloser communication mode, microprocessor U3' has a time delay of 10 seconds to allow the host computer sufficient time to send information.

Recloser Related Commands

The host computer can send two recloser related commands, recloser status or recloser trip.

Recloser Status

The first piece of information which may be requested by the host computer is the operational status of the recloser. An auxiliary switch is mounted on the recloser control. This switch is connected across terminals L7 and L8. When the recloser is closed an electrical short will exist between L7 and L8, when this auxiliary switch is open, a 5 Volt DC Potential will be applied to R27, which is connected to pin 3, Microprocessor U3' via resistor R29. The analyzing computer will display the following characters representing recloser status conditions.

1. Aux switch closed, recloser closed and energized.
2. Aux switch closed, recloser closed and de-energized, source side de-energized.
3. Aux switch open, recloser open, source side energized.
4. Aux switch open, recloser open, source side de-energized.

Recloser Trip

The second piece of information is a recloser trip command. If the microprocessor U3', receives a recloser trip command, a +5 Volt DC signal is provided out of U3', pin 13. The signal passes through capacitors C5 and C9 and into the base of transistor Q3. The resultant voltage across R9 and into transistor Q3 becomes forward biased. This results in a sufficient flow of current through the coil of RLY1 such that RLY1 contacts close, making an electrical connection between L4 and L5. L4 and L5 are connected to the recloser circuitry such that an electrical connection between L4 and L5 will cause the recloser to "Trip," thereby isolating the high impedance fault. Microprocessor U3' then fetches unit serial number from memory U2' and sends the serial number and voltage status condition information and the recloser status information to the host computer.

Polling

The voltage monitor responds to telephone call by the host computer, forcing a reporting activity. This allows periodic verification that a monitor is operational on both the telephone and electrical system.

After sending the status information, microprocessor U3' resets the change-of-state indicator to prevent further calls from being made, deactivates the main power supply and returns to the Utility Line Voltage Sensing Mode. Microprocessor U3' waits for 10 seconds to allow the host computer time to send control information. The host computer can send two commands, a recloser activation command or a status command. If microprocessor U3' receives a recloser activation command, it activates RLY1 for the amount of time which was specified in the activation command packet. Microprocessor U3' then fetches the unit serial number from memory U2' and sends the serial number, power line condition information, and recloser status information to the host computer. After sending the status information microprocessor U3' resets the change-of-state indicator to prevent further calls being made, deactivates the main power supply and returns to the Power Line Testing Mode when microprocessor U3' receives a status information, as just described.

Operation of Host Computer Program

The high impedance isolator system of the present invention is controlled by a host analyzing computer system with both hardware and software developed for the specific application. This host computer program has been developed using Microsoft Visual Basic version 5.0 running on a Microsoft Windows 95 Intel Pentium platform. The computer telephony functions of the program have been implemented through Visual Voice for TAPI ActiveX controls from Artisoft, Inc. (Cambridge Mass.). The computer uses the Proline/2v computer telephony board from Dialogic, Inc. (Parsippany, N.J.) for call handling Microsoft Access 97 handles the database functions of this program.

There are two main elements to the analyzing host computer program. The first element is a piece of controlling software, which manages access to the electrical grid database and analyzes input from the remote voltage monitors. The voltage monitor and associated combination monitor recloser trip control are grouped in schematic format on circuit grids in the computer program.

The host computer uses a single database with two tables. One table is used to store the combination voltage monitor recloser trip control CVMRTC information. The other table is used to provide electrical grid for the various voltage monitor groups plus the voltage monitor status information.

The host computer program begins its operation by checking for the number of available phone lines. This program then starts up a line-monitoring program for each available line. Once these are active, the program is in a waiting state until a voltage monitor places a call or the user elects to manually access a file. Available actions are as follows:

(1) Analyze Database—User selectable or automatically triggered;
(2) Clear Log—User selectable;
(3) Modify Database/Grid—User selectable;
(4) Modify Database/Recloser—User selectable; or
(5) Receive Fault Information—Automatic from remote voltage monitor.

Analyze Database

This action can be triggered in two ways. The first is by receiving a loss of voltage information from a voltage monitor device. When information indicating a loss of voltage has occurred, a 90-second time delay begins. When 90 seconds has expired from receipt of the last loss of voltage report, the database analysis process begins. The second trigger method is through a keyboard operator single clicking on the "Analysis" button in the main program window.

Either event initiates a process of analysis of the electrical grid table in the database. The software analyzes all available loss of voltage information to determine which groups exhibit loss of voltage. This information is forwarded to a log file. This initial information is then presented to the dispatcher in an outage format by transformer location number.

Once this information is forwarded to the dispatcher, the main program refers to the recloser/controller information in the database to find the group information for the appropriate recloser/controller device. Up to five attempts are made to contact the group recloser/controller associated with outage. If contact is established, dual tone mufti-frequency (DTMF) control signals are sent to the recloser/modem controller. The monitor controller responds to the DTMF control signals with a DTMF status message after sending this status information, the recloser controller ends the call. This status message is analyzed by the host computer to determine if the recloser has tripped to clear the high impedance fault. If the device has been tripped, this is indicated in the log and there is no further host computer action. In the event the recloser device has not been tripped, the host computer uses an available instance of the line-monitoring program to contact the recloser/controller a second time. This time, when the recloser/controller answers, a second DTMF control sequence is sent to the recloser/controller. After sending this sequence, the line monitoring program ends the call. This sequence code causes the combination recloser to locally trip unit to trip the recloser, de-energizing the high impedance fault. This action is also reported to the log to the dispatcher. The host computer is programmed to attempt 5 tries before submitting a fail to contact report to the dispatcher.

Database—Grid Modification

Under the heading "Select Database to Modify" on the main program window, there is a button labeled "Transformer". By clicking on this button, a new window is brought up which displays the first record in the electrical grid table. This window is now the active window. From this window, a user can modify, delete, and add records to the table. There is also a control that allows the user to step through the table record by record. The window can be closed via standard Microsoft window close procedures or by clicking on the Close button. Closing the window reactivates the main program window as the active window.

Database Modification—Recloser Group

Under the heading "Select Database to Modify" on the main program window, there is a button labeled "Recloser". By clicking on this button, a new window is brought up which displays the first record in the recloser table. This window is now the active window. From this window, a user can modify, delete, and add records to the table. There is also a control that allows the user to step through the table record by record. The window can be closed via standard Microsoft window close procedures or by clicking on the "Close" button. Closing the window reactivates the main program window as the active window.

Receipt and Storage——Voltage Status Information

This is background activity that activates the instance of the line-monitoring program running on the phone line that receives that call from the remote monitor. When an inbound call is detected on the line, the call is allowed to ring two times before answering. This permits the program to pull any available caller ID information on the source of the call. Any available caller ID information is then displayed in the log listbox on the main program window. When the call is answered, the program immediately prepares to receive a DTMF signal that contains the unit serial number and voltage status information. The voltage status information is then passed back to the main program, which updates the state information in the electrical grid table.

If the state information indicates that power has been lost, the main program waits 90 seconds to receive any additional outage reports. When 90 seconds passes from the receipt of the last outage report, the main program initiates the "Analyze Database" process.

If the state of information indicates that voltage has been restored. the main program updates the electrical grid table with new status information and enters a message in the log listbox indicating that voltage has been restored.

Clearing Log

The "Clear Log" button on the main program window is used to clear the contents of the latest log listbox on the main program windows.

General Program Access

The main program can be started by double clicking on the program icon or by selecting the program from the Windows 95 Start menu. The main program can be shutdown via standard Microsoft program shutdown procedures. Shutting down the main program also shuts down all instances of the voltage monitoring program and releases control of the modem port(s).

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. For use in an electric power distribution system having an overcurrent protection arrangement, a host computer and a plurality of branches each including one or more conductors, a method for detecting and isolating a high impedance fault which has not been de-energized by said overcurrent protection arrangement, said method comprising the steps of:

continuously monitoring an AC voltage in remote conductors in the electric power distribution system for detecting a change in AC voltage status in a conductor in the electric power distribution system;

comparing a change in the AC voltage status in a conductor in the electric power distribution system with a predetermined voltage level;

providing identifying indicia and voltage status condition information to the host computer for a conductor in a given branch having a change in AC voltage status less than said predetermined voltage level;

interrogating other conductors in said given branch adjacent to the conductor having said change in AC voltage status to determine the location in said given branch of the conductor having said change in AC voltage status; and comparing the duration of a change in AC voltage status greater than said predetermined voltage level in a conductor with a selected time delay and providing said trip signal when the change in AC voltage status exceeds said predetermined voltage level for a duration greater than said selected time delay for de-energizing and isolating the conductor having the detected change in AC voltage status less than said predetermined voltage level from the remaining portion of the electric power distribution system.

2. The method of claim 1 further comprising the step of automatically notifying a work crew dispatcher of an AC voltage status less than said predetermined voltage level in an identified conductor and the location of said identified conductor.

3. The method of claim 2 further comprising the step of continuously monitoring a de-energized conductor isolated from the remaining portion of the electric power distribution system as having an AC voltage status exceeding said predetermined voltage level to detect restoration of voltage to said conductor.

4. The method of claim 3 further comprising the step of automatically notifying a work crew dispatcher of restoration of voltage to a conductor previously de-energized and isolated from the remaining portion of the electric power distribution system by said shutdown device.

5. The method of claim 4 wherein said identifying indicia and voltage condition information are provided to said host computer and said trip signal is provided to a shutdown device via an independent communications network not connected to said electric power distribution system.

6. The method of claim 5 further comprising the step of storing said identifying indicia and voltage condition provided to the host computer in a data base file.

7. The method of claim 6 further comprising the step of continuing to monitor the AC line voltage following detection of said change in AC voltage status in a first conductor to detect a possible change in AC voltage status in a second conductor.

8. The method of claim 7 wherein said predetermined voltage level is 85 volts.

9. The method of claim 8 wherein the AC line voltage is monitored every one-half second.

10. The method of claim 9 wherein said selected time delay is 45 seconds.

11. The method of claim 10 wherein said electric power distribution system includes a plurality of transformers each having respective primary and secondary windings, and wherein the AC voltage on the secondary windings of a plurality of said transformers is monitored.

12. For use in an electric power distribution system having an overcurrent protection arrangement, a host computer, and a plurality of branches each including one or more conductors, apparatus for detecting a high impedance fault which has not been de-energized by said overcurrent protection arrangement, said apparatus comprising:

voltage monitoring means for continuously monitoring an AC voltage in remote conductors in the electric power distribution system for detecting a change in AC voltage status in a conductor in the electric power distribution system;

comparison means coupled to said voltage monitoring means for comparing a change in the AC voltage status in a conductor in the electric power distribution system with a predetermined voltage level;

conductor identifying means for providing identifying indicia and voltage status condition information to the host computer for a conductor in a given branch having a change in AC voltage status less than said predetermined voltage level;

means for interrogating other conductors in said given branch adjacent to the conductor having said change in AC voltage status to determine the location in said given branch of the conductor having said change in AC voltage status;

shutdown means in said given branch coupled to the host computer and responsive to a trip signal output by the host computer for de-energizing and isolating the conductor having the detected change in AC voltage status less than said predetermined voltage level from the remaining portion of the electric power distribution system; and an independent communications network coupling said conductor identifying means and said means for interrogating other conductors in said given branch to the host computer, wherein said independent communications network is not connected to the electric power distribution system.

13. The apparatus of claim 12 further comprising means for automatically notifying a work crew dispatcher of an AC voltage status less than said predetermined voltage level in an identified conductor and the location of said identified conductor.

14. The apparatus of claim 13 wherein said independent communications network is a telephone network, a wireless radio frequency communications network, or a satellite communications network.

15. The apparatus of claim 14 wherein said electric power distribution system includes a plurality of transformers each having respective primary and secondary windings, and wherein said voltage monitoring means is coupled to the secondary winding of said transformers.

16. The apparatus of claim 15 further comprising means for detecting restoration of an AC voltage status exceeding said predetermined voltage level on a previously de-energized conductor which had been isolated from the remaining portion of the electric power distribution system.

17. For use in an electric power distribution system having an overcurrent protection arrangement and a plurality of branches each including one or more transformers, wherein each transformer includes a primary and a secondary winding, apparatus for detecting and isolating a high impedance fault which has not been de-energized by said overcurrent protection arrangement, said apparatus comprising:

a host computer;

a plurality of voltage monitoring means each coupled to an associated secondary winding of a transformer for sensing a change in AC voltage status in its associated transformer and generating a first signal representing said change in AC voltage status;

an independent communications network coupling each of said voltage monitoring means to the host computer for providing a first signal from a voltage monitoring means to the host computer, wherein said first signal includes identifying indicia and voltage condition information for the transformer experiencing a change in AC voltage status, wherein said host computer generates a trip signal in response to receipt of said first signal from a voltage monitoring means; and a plurality of trip controllers each coupled to said independent communications network and further connected to one of said plurality of branches and responsive to a trip signal output by said host computer on said independent communications network for removing the transformer experiencing the change in AC voltage status from the electric power distribution system.

18. The apparatus of claim 17 wherein said independent communications network is a telephone communications network, a wireless radio frequency communications network, or a satellite communications network.

19. The apparatus of claim 17 wherein a voltage monitoring means further provides a second signal to the host computer via said independent communications network, wherein said second signal represents restoration of full voltage to a conductor following a change in AC voltage status.

20. The apparatus of claim 19 further comprising time delay means in said host computer for awaiting receipt of another signal from another voltage monitoring means prior to providing a trip signal to a trip controller.

21. Apparatus for monitoring AC line voltage in an electric power distribution system and providing an indication of a low voltage condition in the electric power distribution system to a host computer via a telephone network, said apparatus comprising:

controller means coupled to the electric power distribution system and responsive to the AC line voltage thereon for providing an output signal when the AC line voltage is less than a predetermined voltage level;

a ring signal generator coupled to the telephone network and to said controller means and responsive to said output signal for generating and providing a ring signal to the telephone network for initiating communication with the host computer, wherein said controller means provides an indication to the host computer via the telephone network that the AC line voltage is less than said predetermined voltage level;

a standby power supply powered by the telephone network for energizing the apparatus at reduced power during monitoring of the AC line voltage;

a main power supply powered by the telephone network for energizing the apparatus at full power for communicating with the host computer, wherein said controller means is coupled to said standby and main power supplies for controlling their operation; and circuit means for protecting the telephone network from the electric power distribution system.

22. The apparatus of claim 21 wherein said circuit means for protecting the telephone network from the electric power distribution system includes a voltage divider.

23. The apparatus of claim 22 wherein said predetermined voltage level is 85 VAC, with a nominal AC line voltage of 120 VAC.

24. The apparatus of claim 23 wherein said controller means includes a memory for storing a first telephone number representing a low voltage condition and a second telephone number representing a return to normal voltage.

25. The apparatus of claim 24 further comprising a sectionalizer circuit responsive to an output from said controller means for restoring full voltage to the electric power distribution system following a low voltage condition.

26. The apparatus of claim 25 wherein said sectionalizer circuit includes a relay actuated by a DC signal from said controller means.

* * * * *

UNITED STATES PATENT AND TRADEMARK OFFICE
CERTIFICATE OF CORRECTION

PATENT NO.   : 6,292,340 B1
DATED        : September 18, 2001
INVENTOR(S)  : Timothy M. O'Regan and James Hannas It is certified that error appears in the above-identified patent and that said Letters Patent is hereby corrected as shown below:

Column 17,
Line 26, delete "Une" and insert -- Line --.

Column 21,
Line 28, delete "." and insert -- , --.

Signed and Sealed this

Sixteenth Day of April, 2002

Attest:

JAMES E. ROGAN
Attesting Officer — Director of the United States Patent and Trademark Office